US008859869B2

(12) United States Patent
Murray et al.

(10) Patent No.: US 8,859,869 B2

(45) Date of Patent: Oct. 14, 2014

(54) DRUMHEAD WITH EXTENDED COLLAR

(71) Applicant: D'Addario & Company, Inc., Farmingdale, NY (US)

(72) Inventors: Steven T. Murray, Oak Beach, NY (US); Richard K. Drumm, Mt. Sinai, NY (US)

(73) Assignee: D'Addario & Company, Inc., Farmingdale, NY (US)

( * ) Notice: Subject to any disclaimer, the term of this patent is extended or adjusted under 35 U.S.C. 154(b) by 0 days.

(21) Appl. No.: 13/803,813

(22) Filed: Mar. 14, 2013

(65) Prior Publication Data

US 2014/0260893 A1 Sep. 18, 2014

(51) Int. Cl.

*G01D 13/02* (2006.01)

*G10D 13/02* (2006.01)

(52) U.S. Cl.

CPC .................................... *G10D 13/027* (2013.01)

USPC ........................................................ 84/411 R

(58) Field of Classification Search

None

See application file for complete search history.

(56) References Cited

U.S. PATENT DOCUMENTS

| | | | | |
|---|---|---|---|---|
| 2,934,989 | A * | 5/1960 | Belli et al. | 84/414 |
| 2,979,981 | A * | 4/1961 | Ludwig | 84/411 R |
| 3,250,169 | A * | 5/1966 | Stone, Jr. et al. | 84/411 R |
| 3,362,275 | A * | 1/1968 | Koishikawa | 84/411 R |
| RE26,415 | E * | 6/1968 | Ludwig | 84/411 R |
| 3,421,400 | A * | 1/1969 | Yokoi | 84/411 R |
| 4,779,508 | A * | 10/1988 | Beals | 84/414 |
| 5,159,139 | A * | 10/1992 | Beals et al. | 84/414 |
| 5,417,136 | A * | 5/1995 | Kralik et al. | 84/411 R |
| 5,554,812 | A * | 9/1996 | Donohoe | 84/413 |
| 5,864,077 | A * | 1/1999 | Gatzen | 84/414 |
| 6,184,451 | B1 * | 2/2001 | Miller et al. | 84/411 R |
| 6,762,353 | B2 * | 7/2004 | Okumura | 84/411 R |
| 6,949,701 | B2 * | 9/2005 | Okumura | 84/411 R |
| 7,084,338 | B2 * | 8/2006 | Hagiwara | 84/413 |
| 7,214,867 | B1 * | 5/2007 | Gatzen et al. | 84/411 R |
| 7,888,574 | B1 * | 2/2011 | Acoutin | 84/411 R |
| 2014/0060284 | A1 * | 3/2014 | Yoshino | 84/411 R |

* cited by examiner

*Primary Examiner* — Robert W Horn

(74) *Attorney, Agent, or Firm* — Alix, Yale & Ristas, LLP

(57) ABSTRACT

A drumhead comprising a circular membrane having a flat central play region, a collar extending outwardly and downwardly from the play region, and an outer edge region extending from the collar. A hoop defines a circular channel in which the outer edge region of the membrane is retained. The collar has a convexly curved region having upper and lower ends spanning an included angle, with the upper end transitioning tangentially into the play region and a frustoconical skirt region flaring outwardly from the lower end of the curved region and transitioning into the outer edge area. The included angle of the convexly curved region is about 90 deg., and the skirt and outer edge region of the membrane frustoconically extend from the lower end of the curved region to the channel of the hoop, at a substantially uniform angle in the range of about 10 to 30 deg.

23 Claims, 4 Drawing Sheets

DRUMHEAD WITH EXTENDED COLLAR

BACKGROUND

The present invention relates to music drum heads. The profile of the collar on a drum head is a critical design consideration. Many drums of nominally standard size actually vary in diameters, with the result that the bearing edge (the part of the drum shell that contacts the underside of drum head) also varies considerably with respect to diameter, angle, and accuracy.

Some vintage drums, which are highly coveted, require a drumhead with a slightly larger diameter so that the bearing edge does not interface with the curved or formed collar area of the drum head. The drum head will tune better, quicker and easier if the bearing edge contacts the flat plane of the drumhead film.

Modern drumheads are with a carefully coordinated combination of heat, pressure and time. It is a difficult task with many intricate variables, which can lead to lower yields that satisfy the desired quality threshold.

SUMMARY

The invention improves the tuning of drumheads by providing a greater latitude in accommodating variations in the diameters of drum shell bearing edges, so that the bearing edge bears on the underside of a flat rather than curved portion of the drumhead membrane.

According to one aspect, the invention can generally be characterized as a drumhead comprising a circular membrane having a flat central play region, a collar extending outwardly and downwardly from the play region, and an outer edge region extending from the collar. A hoop defines a circular channel in which the outer edge region of the membrane is retained. The collar has a convexly curved region having upper and lower ends spanning an included angle, with the upper end transitioning tangentially into the play region and a frustoconical skirt region flaring outwardly from the lower end of the curved region and transitioning into the outer edge area.

The included angle of the convexly curved region is about 90 deg., and the skirt and outer edge region of the membrane frustoconically extend from the lower end of the curved region to the channel of the hoop, at a substantially uniform angle in the range of about 10 to 30 deg.

According to another aspect, the invention can be characterized as a drum comprising a cylindrical shell having an open top and a profiled upper end surrounding the open top and defining a circular bearing edge, with a drumhead on the shell, and a counter hoop for bearing downwardly on the hoop and thereby tightening the drumhead membrane over the bearing edge. The drumhead collar comprises a convexly curved region having upper and lower ends spanning an included angle, with the upper end transitioning tangentially into the play region, and a frustoconical skirt region flaring outwardly from the lower end of the curved region and transitioning into an outer edge region, configured such that while the membrane rests on the shell before tightening of the drumhead, the drumhead is supported only by the tangential transition region resting on the bearing edge.

The present improvement is especially effective relative to the prior art, when the drumhead is tuned at a relatively low tension. At very high tension, the membrane of almost any drumhead can be stretched so much that the transition between the upper end of the curved region of the collar and the flat play area is pulled radially outward, from inside the bearing edge to substantially on the bearing edge.

DETAILED DESCRIPTION

FIGS. 1-4 show cross-sections of one side of prior art drumheads, having various shapes of curved collars extending generally outwardly and downwardly from a central play area to a hoop. It should be understood that drums come in many sizes, typically specified by a nominal diameter of the drum shell, and that drumheads likewise come in various corresponding sizes specified by the diameter of the drum shell. For convenience, the present disclosure will focus on a nominal 14 inch drumhead, but it should be understood that similar principles are applicable to drums having other diameters.

Figure 1:
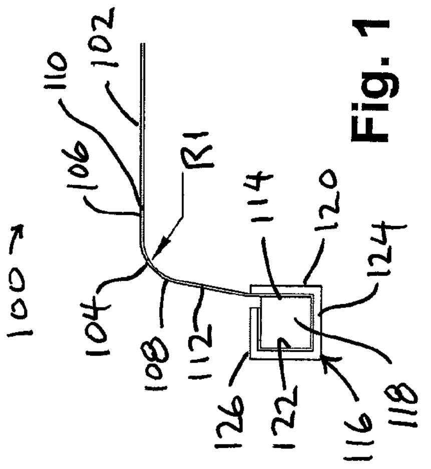
FIG. 1 shows a first prior art drumhead.

In the embodiment 100 of FIG. 1, the drumhead has a flat play area 102 of 13.69 inches diameter. The collar 104 has a convexly curved region with a radius R1 of about 0.156 inch spanning upper and lower ends 106, 108, with the upper end having a tangential transition 110 with the flat play area, and a skirt region 112 extending tangentially from the lower end 108 of the curved region. An outer edge region 114 extends frustoconically from the skirt region and enters a circular hoop 116 that defines a square channel 118 having inner and outer walls 120, 122 spanning a bottom 124. The outer edge region 114 enters the hoop vertically along the inner wall 120 and continues along the bottom 124 and outer wall 122. A metal capture ring 126 is secured in the channel 118 against the hoop, thereby trapping the outer edge region 114 against the channel walls and bottom.

Figure 2:
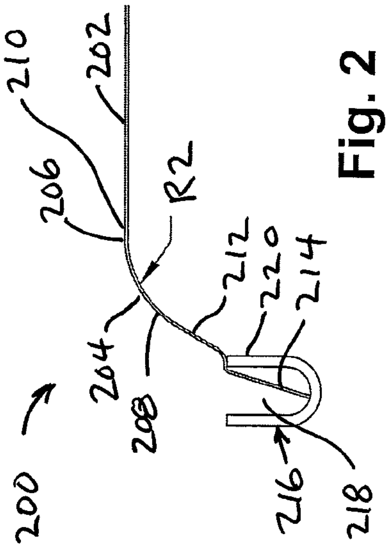
FIG. 2 shows a second prior art drumhead.

FIG. 2 shows another prior art drumhead 200 having a flat play area 202 of about 13.17 inches with a curved region in collar 204 that has a significantly larger radius of curvature R2 (about 0.375 inch) than the collar 104 of the embodiment of FIG. 1. The collar 204 has an upper end 206 that transitions tangentially 210 to the play area 102 and a lower end 208 that transitions tangentially into skirt region 212. The outer edge region 214 enters hoop 216. In this drumhead, the collar 204 and outer edge region 214 have an overall serpentine shape with the outer edge region 214 entering the hoop 216 at an angle on the top of the inner wall 220 of a substantially U-shaped channel 218. In this embodiment, the outer edge region 214 is captured in an anchor ring of epoxy or similar resin within the channel, thereby avoiding the metal capture ring used in the channel of the embodiment of FIG. 1.

Figure 3:
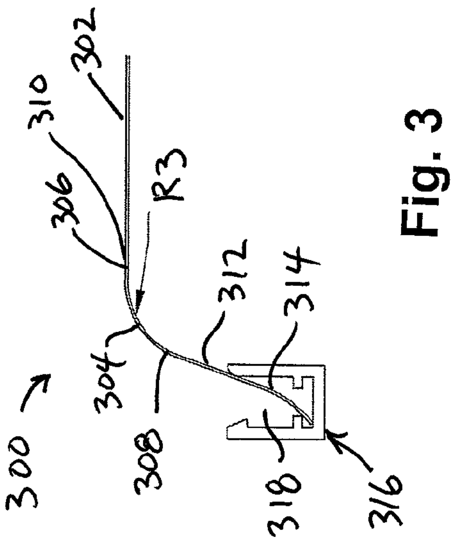
FIG. 3 shows a third prior art drumhead.

FIG. 3 shows another prior art drumhead 300 having a play area 302 of 13.42 inches and a radius of curvature R3 of about 0.300 inch. In this embodiment, the curved region of the collar 304 has upper end 306 that tangentially transitions 310 to the play area 302 and a lower end 308 that transitions tangentially 310 to the skirt 312. The outer edge region 314 extends from the skirt in serpentine fashion as it enters a substantially boxed U-shaped channel 318 in hoop 316, where it is secured in a ring of epoxy or similar resin.

Figure 4:
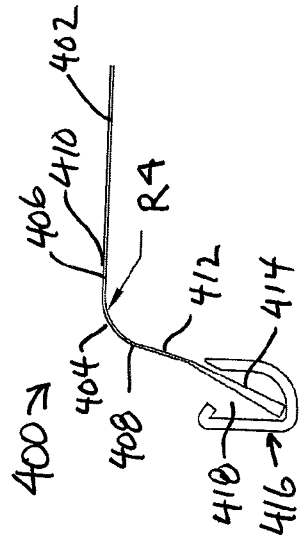
FIG. 4 shows a fourth prior art drumhead.

FIG. 4 shows another prior art drumhead 400 marketed by the assignee of the present invention, having a play area 402 of 13.65 inches and collar 404 having a convexly curved region with radius R4 of 0.156 inch and upper and lower ends 406, 408. The upper end 406 transitions tangentially at 410 to play surface 402 and the skirt 412 transitions tangentially from the lower end 408. The outer edge region 414 flares outwardly from skirt for entry into a U-shaped channel 418 in hoop 416 where it is secured with a ring of epoxy or similar resin.

As noted in the Background, although the nominal standard diameter of one type of drum shell is, for example, 14 inches, the play area as designed into the drumhead may not match the actual diameter of the bearing edge. If the designed play area is smaller than the bearing diameter, due to variations in the diameter of the circular bearing edge, tuning the drumhead becomes difficult. This condition is illustrated in FIG. 5.

Figure 5:
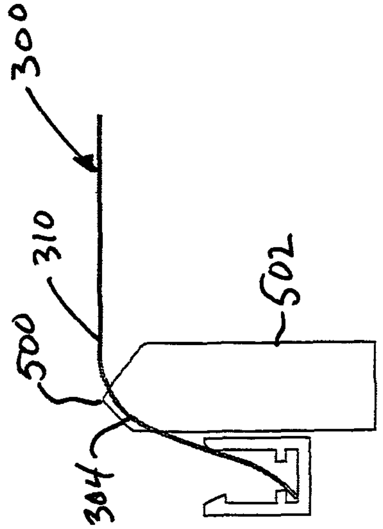
FIG. 5 shows the prior art drumhead of FIG. 3 superimposed on a triangular bearing edge of a drum shell, indicating the interference which would be accommodated when the drumhead is tightened onto the shell.

FIG. 5 shows the drumhead 300 of FIG. 3 superimposed on a triangular bearing edge 500 of drum shell 502. It can be seen that the bearing edge 500 would contact the collar 304 radially outwardly of the tangential transition 310. Accordingly, the membrane is not flat where contacted by bearing edge 500.

Figure 6:
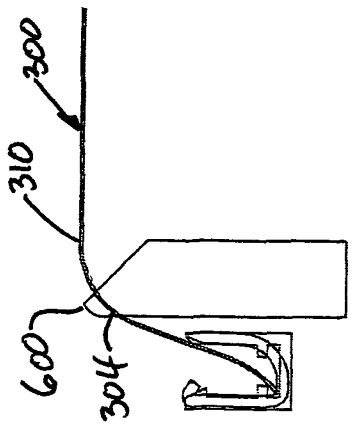
FIG. 6 is similar to FIG. 5 in showing the prior art drumhead of FIG. 3, but superimposed on an oblique bearing edge of a drum shell, indicating the interference which would be accommodated when the drumhead is tightened onto the shell.

FIG. 6 shows the drumhead 300 of FIG. 3 superimposed on a typical 45° oblique bearing edge 600. The bearing edge contacts the collar 304 radially outward of the tangential transition 310, to an even greater extent than the case as shown in FIG. 5.

Figure 8:
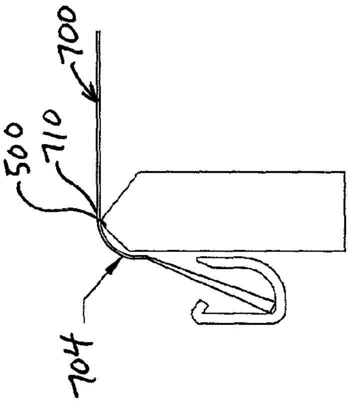
FIG. 8 shows the drumhead of FIG. 7 superimposed on a triangular bearing edge of a drum shell, corresponding to FIG. 5.
Figure 9:
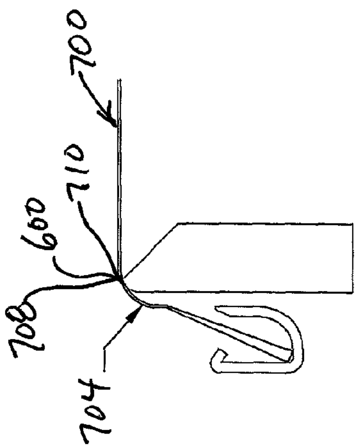
FIG. 9 shows the drumhead of FIG. 7 superimposed on an oblique bearing edge of a drum shell, corresponding to FIG. 6.

It is believed that the mismatch between the bearing edge and a flat portion of the drumhead as illustrated in FIGS. 5 and 6, is similarly prevalent to varying degrees with respect to the other prior art represented in FIGS. 1, 2 and 4. This mismatch is overcome by the present invention, as shown in FIGS. 7-9.

Figure 7:
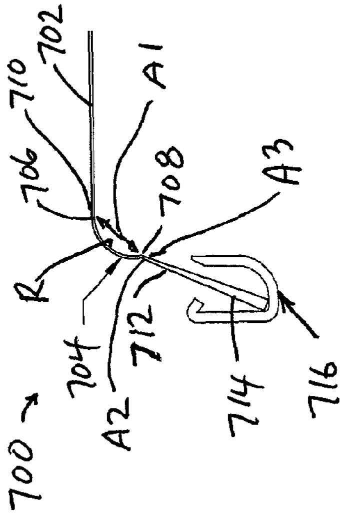
FIG. 7 shows a drumhead according to one embodiment of the present invention, corresponding to the prior art shown in FIGS. 1-4.

FIG. 7 shows a cross-section of a drumhead 700 according to the present invention, corresponding to the cross sections shown in FIGS. 1-4. The drumhead 700 comprises a circular membrane having a flat central play region 702 of 13.71 inches, and a collar 704 extending outwardly and downwardly from the play region. The convexly curved region of the collar 704 has upper and lower ends 706, 708, with the upper end 708 transitioning 710 tangentially to the play area 702. The skirt 712 extends from the lower end 708 and an outer edge region 714 extends from the skirt. The outer edge region 714 is anchored in a resin ring in hoop 716, in a manner similar to the configuration shown in FIG. 4. The upper and lower ends 706, 708 of the curved region span an included angle A1.

The frustoconical skirt region 712 flares outwardly from the lower end 708 of the curved region at an angle A2, and preferably smoothly transitions into outer edge region 714. The inner surface of the skirt 712 and outer edge region form another angle, A3, at the lower end 708 of the curved portion of collar 704. In the illustrated embodiment, the radius of curvature R is 0.156 inch, and the included angle A1 of the curved region is 90° (within manufacturing tolerances). The skirt 712 extends frustoconically from the lower end 308 of the curved region at an angle A2, generally at least about 10 deg. and preferably in range of about 15-30 deg. Angle A3 is generally close to angle A2, differing only as a result of the outwardly enlarging taper of the edge region 714, which assists the anchoring in the hoop 716. In the preferred embodiment angle A2 is about 23 deg. and angle A3 is about 18 deg.

In contrast to each of the prior art drumheads shown in FIGS. 1-4, the drumhead 700 shown in FIG. 7 has a distinct outward bend line at the lower end 708 of the curved region of the collar 704, i.e., at the upper end of skirt 712. This is most evident because, with an included angle A1 of 90° and the upper end 706 transitioning tangentially 710 to a horizontal membrane surface 702, the lower end 708 of the collar is vertical relative to the upper end 306. The flaring out of the skirt 712 thus exhibits an inflection at the lower end 308. The outer region 714 enters the hoop 716 at nearly the same angle A3 as the angle A2 of the skirt 712. With the included angle A1 of 90 deg., the angles A2 and A3 are effectively measured with respect to vertical.

Although the drumhead 700 according to FIG. 7 shares some superficial features with each of the prior art drumheads shown in FIGS. 1-4, the drumhead according to FIG. 7 exhibits subtle but functionally important differences. The flat portion 702 of the membrane defines a larger play area and better accommodates a range of actual bearing edge diameters 500, 600. The 90° included angle A1 and associated radius of curvature R of the curved region of collar 704 in essence "push out" flat area 702, and assure that, except perhaps for drum shells that are unusually off nominal diameter, the bearing edge will bear on the underside of a flat surface, not within the collar region 704.

FIG. 8 shows the drumhead 700 of FIG. 7 on a triangle bearing edge 500, corresponding to FIG. 5. In FIG. 8, it can be seen that there is no interference between the collar 704 and the bearing edge 500, as in the case of FIG. 5, so the bearing edge contacts a flat portion 710 of the membrane rather than the collar region 704.

FIG. 9 shows the drumhead 700 of FIG. 7 on an oblique bearing edge 600, corresponding to FIG. 6. For a nominal drum diameter, the actual diameter of an oblique bearing edge can in some circumstances be larger than the typical maximum diameter of the triangular bearing edge. Although in most cases the drumhead 700 according to FIG. 7 can accommodate a relatively large oblique bearing edge, under the worst circumstance the bearing edge would contact the membrane at the upper end 708 of the curved region rather than at the flat transition 710.

Figure 10:
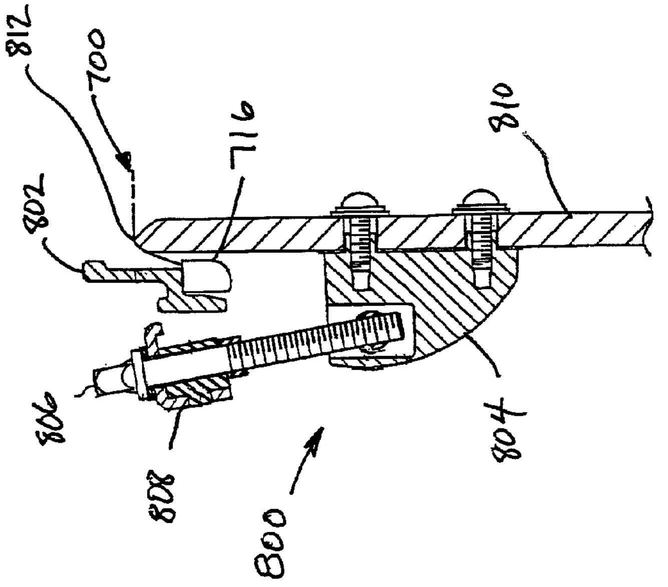
FIG. 10 shows a drumhead mounted on a drum shell.

As represented in FIG. 10, the drumhead 700 of FIG. 7 can be mounted on a drum 800 in a known manner, whereby a counter hoop 802 and means such as lug 804, bolts 806 and hooks 808 supported by the shell 810 and operatively associated with the counter hoop 802, can be drawn toward each other and thus bear downwardly on the hoop 716 to tighten the membrane over the bearing edge. The extent of tightening is closely associated with tuning the drumhead, but in any event ideal tuning would avoid the bearing edge 812 contacting a curved portion of the collar.

The present invention is most noticeably different from the prior art in relation to the drum shell, when the drumhead 700 rests on the drum shell before tightening, whereby the drumhead is supported only by the tangential transition 710 region resting on the bearing edge. It can thus be appreciated that the drumhead 700 described with respect to FIGS. 7-9 need not be distorted to overcome the interference evident in FIGS. 5 and 6 in order to tighten and tune the drumhead.

The invention claimed is:

1. A stand-alone drumhead comprising:

a circular membrane having a flat central play region, a collar extending outwardly and downwardly from the play region, and an outer edge region extending from the collar; and a hoop defining a circular channel in which the outer edge region of the membrane is retained;

wherein the collar has a convexly curved region having upper and lower ends spanning an included angle, with the upper end transitioning tangentially into the play region and, a frustoconical skirt region flaring outwardly from a bend line at the lower end of the curved region and transitioning into said outer edge region.

2. The drumhead of claim 1, wherein the skirt region and outer edge region of the membrane extend at a uniform frustoconical angle from the lower end of the curved region of the collar.

3. The drumhead of claim 1, wherein the skirt region flares out at an angle of at least about 10 deg.

4. The drumhead of claim 3, wherein the skirt region flares out at an angle in the range of about 15-30 deg.

5. A stand-alone drumhead comprising:

a circular membrane having a flat central play region, a collar extending outwardly and downwardly from the play region, and an outer edge region extending from the collar; and a hoop defining a circular channel in which the outer edge region of the membrane is retained;

wherein the collar has a convexly curved region having upper and lower ends spanning an included angle with the upper end transitioning tangentially into the play region and, a frustoconical skirt region flaring outwardly from a bend line at the lower end of the curved region and transitioning into said outer edge region; and the included angle of the convexly curved region is about 90 deg.

6. The drumhead of claim 5, wherein the skirt region and outer edge region of the membrane extend at a uniform frustoconical angle from the lower end of the curved region of the collar.

7. The drumhead of claim 5, wherein the curved region of the collar has a uniform radius of curvature of about 0.156 inch.

8. The drumhead of claim 6, wherein the curved region of the collar has a uniform radius of curvature of about 0.156 inch.

9. The drumhead of claim 6, wherein the skirt region and outer edge region of the membrane extend at a uniform frustoconical angle in the range of about 15-30 deg.

10. A drum comprising:

a cylindrical shell having an open top and a profiled upper end surrounding the open top and defining a circular bearing edge;

a drumhead on the shell, including a circular membrane having a flat central play region, a collar extending outwardly and downwardly from the play region, an outer edge region extending from the collar, and a hoop defining a circular channel in which the outer edge region of the membrane is retained;

a counter hoop and means supported by the shell and operatively associated with the counter hoop, for bearing downwardly on the hoop and thereby tightening the membrane over the bearing edge;

wherein, the collar comprises a convexly curved region having upper and lower ends spanning an included angle, with the upper end transitioning tangentially into the play region, and a frustoconical skirt region flaring outwardly from the lower end of the curved region and transitioning into said outer edge region, and while the membrane rests on the shell before tightening of the drumhead, the drumhead is supported only by said tangential transition region resting on said bearing edge.

11. The drum of claim 10, wherein the included angle of the convexly curved region is about 90 deg. and the skirt and outer edge region frustoconically extend from the curved region of the collar to the channel of the hoop, at an angle of at least about 10 deg.

12. The drum of claim 11, wherein the skirt and outer edge region frustoconically extend from the curved region of the collar to the channel of the hoop, at an angle in the range of 15-30 deg.

13. The drum of claim 10, wherein the skirt region and outer edge region of the membrane extend at a uniform frustoconical angle from the lower end of the curved region of the collar.

14. The drum of claim 10, wherein the curved region of the collar has a uniform radius of curvature of about 0.156 inch.

15. The drum of claim 11, wherein the curved region of the collar has a uniform radius of curvature of about 0.156 inch.

16. The drum of claim 10, wherein the skirt region flares out at an angle of at least about 10 deg.

17. The drum of claim 16, wherein the skirt region flares out at an angle in the range of about 15-30 deg.

18. The drum of claim 13, wherein the skirt region and the outer region flare out at an angle of at least about 10 deg.

19. The drum of claim 18, wherein the skirt region and the outer region flare out at an angle in the range of about 15-30 deg.

20. A stand-alone drumhead comprising:

a hoop defining a circular channel;

a circular membrane having a flat central play region, a collar extending outwardly and downwardly from the play region, and an outer edge region extending outwardly from the collar and retained within the circular channel of the hoop;

wherein the collar has a convexly curved region having upper and lower ends, an inner surface spanning an included angle A1, with the upper end transitioning tangentially into the play region; and a frustoconical skirt region having an outer surface flaring outwardly at angle A2>10 deg. from a bend line in the outer surface of the lower end of the curved region and transitioning into an outer surface of said outer edge region and an inner surface flaring outwardly at angle A3>10 deg. from a bend line in the inner surface of the lower end of the curved region and transitioning into an inner surface of said outer edge region.

21. The drumhead of claim 20, wherein each of angles A2 and A3 is in the range of about 15-30 deg.

22. The drumhead of claim 21, wherein angle A1 is about 90 deg.

23. The drumhead of claim 22, wherein the curved region of the collar has a uniform radius of curvature of about 0.156 inch.

* * * * *